Jan. 26, 1965 R. A. LITMAN 3,166,875

SUPPORT FOR LAPPING TRANSISTOR WAFERS OR THE LIKE

Filed May 24, 1962

INVENTOR.
ROGER A. LITMAN

BY James and Franklin

ATTORNEYS 3,166,875

SUPPORT FOR LAPPING TRANSISTOR WAFERS OR THE LIKE

Roger A. Litman, Needham, Mass., assignor to General Instrument Corporation, Newark, N.J., a corporation of New Jersey Filed May 24, 1962, Ser. No. 197,416
6 Claims. (Cl. 51—216)

The present invention relates to a device for facilitating the lapping of transistor slices or the like.

In the fabrication of transistors and other semi-conductor devices it is often necessary that two opposite sides of the individual semiconductor units be lapped, polished or otherwise mechanically treated. The individual units are exceedingly small and difficult to manipulate, but they must be reliably held in position while one surface thereof is mechanically worked upon, and then they must be turned over to expose the opposite surface thereof for comparable mechanical treatment. The problem involved in holding these individual wafers in place during treatment on one side thereof, then turning them upside down, and again holding them while the other surface is treated is extremely troublesome and time-consuming, and adds greatly to the cost of fabrication of the units. In the past a large number of slices have been loaded on to a plate and more or less rigidly secured thereto by adhesive, after which their upper surfaces were mechanically treated. Thereafter the plate was dipped in a solvent bath to release the adhesive, the slices fell from the plate into the bath of solvent, and they were then individually grasped and repositioned on the plate so that their second side could be treated. This individual handling of a large number of small, delicate pieces represented a real bottleneck in the mass-production of devices of the type under discussion.

To eliminate this bottleneck I have devised a support which permits the batch handling of a large number of wafers, the device being specially adapted to hold wafers firmly while exposed surfaces thereof are being mechanically treated, and to facilitate the rapid transfer of these wafers, as a batch and without individual manipulation, onto another support in upside-down condition, so that their opposite surfaces are then exposed for lapping, polishing or the like. The transferral of the wafers is accomplished very rapidly, the upside-down positioning of the wafers for the second mechanical operation thereon is positively ensured, and the use of adhesive-releasing solvents is eliminated or greatly minimized.

To the accomplishment of the above, and to such other objects as may hereinafter appear, the present invention relates to the construction of a support on which transistor wafers or the like are adapted to be held while being lapped or otherwise mechanically worked upon, and from which they are adapted to be readily transferred in upside-down condition, as defined in the appended claims and as described in this specification, taken together with the accompanying drawings, in which:

Figure 1:
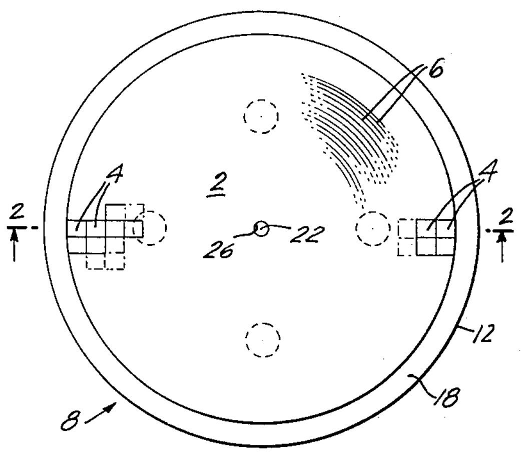
FIG. 1 is a top plan view of the support of the present invention, with some of the transistor wafers being shown in position thereon.

The semiconductor wafers may be formed of a wide variety of materials. In the course of fabrication thereof it often is necessary that opposite surfaces of the wafers be ground, lapped or polished. Purely by way of example, a wafer having a thickness of 0.12 inch may have to have both its upper and lower surfaces lapped to a depth of approximately .002–.003 inch. The wafers must be held reasonably firmly while the lapping operation is performed on one surface thereon, and then they must be turned so as to expose the opposite surface thereof to similar mechanical working.

I provide a plate 2 of metal or the like on which the individual wafers 4 (only some of which are shown in the drawings) are adapted to be mounted, the wafers 4 being packed together closely thereon. The upper surface of the plate 2 is provided with a series of fine grooves or serrations 6, and is adapted to have a slight amount of oil coated thereon, the surface tension of the oil being sufficient to hold the wafers 4 on the plate 2. For clarity of illustration, and because of the fineness of the grooves or serrations 6, those grooves or serrations are not shown in FIGS. 2 and 4.

Figure 2:
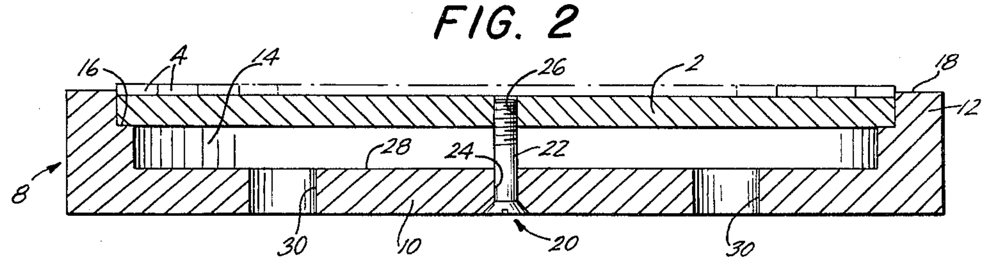
FIG. 2 is a cross sectional view on an enlarged scale, taken along the line 2—2 of FIG. 1.

The plate 2 is adapted to be received on a base generally designated 8, and here shown as comprising a bottom wall 10 having an upstanding rim flange 12 which defines inside itself, and above the bottom wall 10, a recess 14. The inner surface of the flange 12 is provided with a step 16, the plate 2 being received inside the flange 12 and resting on the step 16. The vertical distance from the upper surface 18 of the flange 12 to the step 16 is slightly greater than the thickness of the plate 2, exceeding that thickness by a distance which is a fraction of the thickness of the wafers 4, and which may, for example, be on the order of .01 inch, and preferably between .005 and .008 inch. Hence, when the plate 2 is received on the step 16, as shown in FIG. 2, the exposed upper surfaces of the wafers 4 will extend above the upper surface 18 of the flange 12, thus rendering those upper wafer surfaces available for a lapping or similar mechanical operation. The portion of the flange 12 which extends above the plate 2 defines a lip around the periphery of the plate 2 which prevents the wafers 4 from sliding off therefrom, particularly while the wafer-mounting assembly is being removed from the lapping machine or other device, and, together with the surface tension of the oil which coats the upper surface of the plate 2 and the fact that the wafers 12 are packed over the surface of the plate 2, ensures that the wafers 4 are reliably held in position while their upper surface is being mechanically worked.

In order to retain the plate 2 in proper position on the base 8 an adjustable securing means generally designated 20 is employed, this securing means being adjustable so as to either firmly clamp the plate 2 in place or permit it a desired degree of freedom of movement relative to the base 8. In the form here specifically disclosed this adjustable securing means 20 comprises a screw 22 which passes freely through aperture 24 formed in the bottom wall 10 of the base 8, and is threadedly received in internally threaded aperture 26 formed in the plate 2.

The step 16 is preferably located in a position higher than the upper surface 28 of the bottom wall 10, and a series of apertures 30 are optionally formed in the bottom wall 10, the apertures 30 communicating with the recess 14 and providing access to the lower surface of the plate 2.

When the first surfaces of the wafers 4 are to be machined they are placed upon the plate 2, and the plate 2 is firmly clamped against the step 16, as by screwing the screw 22 into the opening 26. A lapping or other machining operation is then performed on the upper surfaces of the wafers 4 which, as has been described, extend above the upper surface 18 of the base flange 12.

Figure 4:
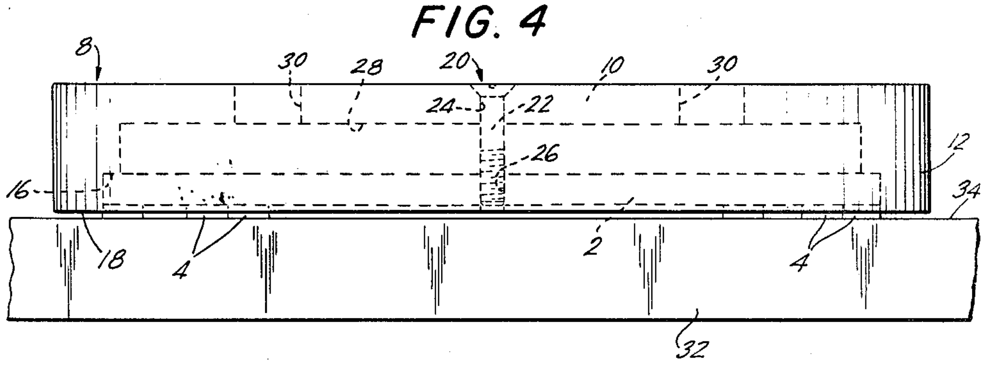
FIG. 4 is a side elevational view showing the device in use to transfer the wafers thereon to another support in upside-down condition.

After this first mechanical operation has been performed the entire assembly of base 8, plate 2 and wafers 4 is inverted and brought down upon a second plate 32 (see FIG. 4). The upper surface 34 of the plate 32 is preferably smooth, and coated with a thin layer of oil. Because of the grooves or serrations 6 on plate 2, the surface tension between the wafers 4 and the plate 32 will exceed the surface tension between the wafers 4 and the plate 2, so that the wafers will tend to transfer from the plate 2 to the plate 32, their previously machined surfaces then being against the plate 32, and their non-machined surfaces being exposed for the second machining step to follow. Dislodgment of all of the wafers 4 from the plate 2 is effected by tapping the base 8 lightly. The effect of this tapping in causing dislodgment of the wafers 4 is enhanced if the plate 2 has first been loosened from the base 8, this being accomplished by unscrewing the screw 22 to a slight degree. The tapping action can, if desired, be applied directly to the plate 2 by passing a suitable instrument through the openings 30 in the bottom wall 10 of the base 8 which is now uppermost.

Figure 3:
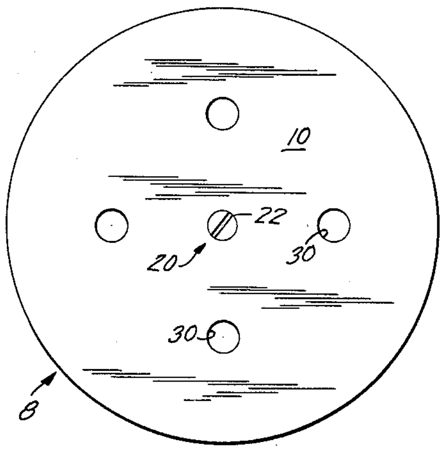
FIG. 3 is a bottom plan view of the device of the present invention.

The base 8 and the plate 2 are then lifted from the plate 32, and the wafers 4 remain on the plate 32 in position to have the next machining operation performed thereon. The precise nature of the plate 32 (shown only schematically in FIG. 4) plays no necessary part in the present invention. The wafers 4 may be held in place on the plate 32 in any desired manner, e.g., by means of a construction similar to that of of FIGS. 1–3, or by means of adhesive, as indicated in the earlier portion of this specification to be a common prior art procedure, or in any other desired manner.

Through the use of the device of the present invention a number of individual wafers may be simultaneously machined and then simultaneously transferred in upside-down condition so that the opposite surfaces thereof may be machined. Individual handling of the wafers is required only when they are first placed upon the plate 2; thereafter the plurality of wafers are handled and manipulated as a batch. This not only reduces manipulation time, but also ensures that all of them will be properly presented for the second machining operation, thus greatly reducing the number of rejects. Moreover, no adhesive is required, and no adhesive-releasing solvent treatment is required. The support is so constructed as to facilitate the required manipulative operations, while at the same time retaining the wafers in position, both during the time that the lapping or other mechanical operation is performed thereon and while the assembly is being removed from the lapping machine.

While but a single embodiment of the present invention is here specifically disclosed, it will be apparent that many variations may be made therein, all within the scope of the instant invention as defined in the following claims.

I claim:

1. A support for elements to be lapped or the like, said support comprising a substantially rigid, substantially flat plate on which said elements are adapted to be placed, a base having a recess opening at the top thereof, said plate being received in said recess, the depth of said recess being deeper than the thickness of said plate, a substantial portion of the outer perimeter of said plate substantially conforming to the corresponding perimeter of said recess, and adjustable securing means operatively connected between said plate and said base and effective selectively to hold said plate on said base firmly or loosely in accordance with the adjustment of said means.

2. The support of claim 1, in which said adjustable securing means comprises a screw passing through said base, accessible from the bottom thereof, and secured to said plate.

3. The support of claim 1, in which said adjustable securing means comprises a screw freely passing through said base, accessible from the bottom thereof, and threadedly secured to said plate.

4. A support for elements to be lapped or the like, said support comprising a substantially rigid, substantially flat plate on which said elements are adapted to be placed, a base comprising a bottom wall, and an upstanding flange on said bottom wall, a recess being formed by said wall and said upstanding flange, said flange having an internal step spaced upwardly from said bottom wall, said plate being received in said recess and inside said flange and resting on said step, the height of said flange above said step being greater than the thickness of said plate, a substantial portion of the outer perimeter of said plate substantially conforming to the corresponding inner surface of said flange, and adjustable securing means operatively connected between said plate and said base and effective selectively to hold said plate on said base firmly or loosely in accordance with the adjustment of said means.

5. The support of claim 1, in which said recess depth is deeper than said plate thickness by a distance on the order of 1/100 of an inch.

6. The support of claim 4, in which the height of said flange above said step is greater than said plate thickness by a distance on the order of 1/100 of an inch.

References Cited by the Examiner

UNITED STATES PATENTS

| | | | |
|---|---|---|---|
| 1,145,189 | 7/15 | Gardner. | |
| 2,339,158 | 1/44 | Drake | 269—7 X |
| 2,395,700 | 2/46 | Walker | 51—216.2 |
| 2,414,575 | 1/47 | Williams. | |

ROBERT C. RIORDON, *Primary Examiner.*

BROUGHTON G. DURHAM, *Examiner.*